United States Patent

Kawata et al.

[11] Patent Number: 5,766,509
[45] Date of Patent: Jun. 16, 1998

[54] LIQUID CRYSTAL DISPLAY ELEMENT

[75] Inventors: Yasushi Kawata; Kohki Takatoh, both of Yokohama, Japan

[73] Assignee: Kabushiki Kaisha Toshiba, Kawasaki, Japan

[21] Appl. No.: 773,199

[22] Filed: Dec. 23, 1996

[30] Foreign Application Priority Data

Dec. 27, 1995 [JP] Japan .................... 7-341185

[51] Int. Cl.$^6$ .................... C09K 19/52; G02F 1/13
[52] U.S. Cl. .................... 252/299.01; 349/187
[58] Field of Search .................... 252/299.01; 349/187

[56] References Cited

U.S. PATENT DOCUMENTS

| | | | |
|---|---|---|---|
| 5,384,067 | 1/1995 | Doane et al. | 252/299.01 |
| 5,426,009 | 6/1995 | Coates et al. | 430/20 |
| 5,437,811 | 8/1995 | Doane et al. | 252/299.01 |
| 5,476,611 | 12/1995 | Nolan et al. | 252/299.01 |
| 5,494,604 | 2/1996 | Chung | 252/299.01 |
| 5,518,654 | 5/1996 | Coates et al. | 252/299.66 |
| 5,538,768 | 7/1996 | Marden et al. | 428/1 |
| 5,560,864 | 10/1996 | Goulding | 252/299.01 |

FOREIGN PATENT DOCUMENTS 5-216015   8/1993   Japan .

OTHER PUBLICATIONS

Yang, et al., "Cholesteric Liquid Crystal/Polymer Gel Dispersion Bistable at Zero Field," IDRC Digest 91, pp. 49–52, 1991.

Heilmeier et al., "A New Electric–Field–Controlled Reflective Optical Storage Effect in Mixed–Liquid Crystal Systems," Appl. Phys. Lett., vol. 13, No. 4, 1968.

Primary Examiner—C. H. Kelly
Attorney, Agent, or Firm—Finnegan, Henderson, Farabow, Garrett & Dunner, L.L.P.

[57] ABSTRACT

A liquid crystal display element has a pair of substrates and a liquid crystal material held between the substrates, the liquid crystal material containing a main liquid crystal material and an auxiliary liquid crystal material whose phase can be separated from the phase of the main liquid crystal material. The liquid crystal material exhibits the states of reflection, scattering and transmission upon receipt of an external stimulation. The particular construction of the liquid crystal material permits the display element to have a wide viewing angle and to exhibit excellent optical characteristics over wide wavelength range.

8 Claims, 2 Drawing Sheets

VIEWING ANGLE [deg]
B - A > 5°

LIQUID CRYSTAL DISPLAY ELEMENT

BACKGROUND OF THE INVENTION

The present invention relates to a liquid crystal display element.

In general, a liquid crystal display element comprises a pair of substrates disposed a predetermined distance apart from each other and a liquid crystal material sealed between these substrates. An electrode film and an alignment film are formed on each of these substrates such that a voltage is applied between the electrode films formed on the substrates. In recent years, an active matrix type liquid crystal display element, in which a thin film transistor (TFT), etc. acting as a switching element is mounted in each pixel portion, has been developed and put to practical use.

In the liquid crystal display element, a selective reflection type display system, in which the characteristics of cholesteric liquid crystals having complex twisted structure are utilized for selectively reflecting light having a specified wavelength so as to achieve transmission and scattering, has been developed by George H. Heilmeier, Joel E. Goldmacher et al. (Appl. Phys. Lett., 13 (1968)). In this display system, an optical switching is performed between a transmission state and a scattering state (or weak scattering state) in a focal conic structure in which the spiral axes of the cholesteric liquid crystals are aligned in a direction substantially parallel with the substrate surface. The transmission state is accompanied by a selective reflection or reflection of light having a wavelength failing to fall within a visible light region in a planar structure in which the spiral axes of the cholesteric liquid crystals are aligned in a direction substantially perpendicular to the substrate surface. Since the transmission state or the scattering state is temporarily stored even after removal of the external stimulation such as an electric field or magnetic field (storage effect), vigorous efforts are being made in an attempt to put the particular display system to practical use in a large matrix driving system.

The display system outlined above, which does not necessitate a polarizing plate, permits a high transmission rate under a transmission state so as to utilize effectively the light. However, serious problems including a low contrast in a scattered state are left unsolved, making it difficult to achieve a sufficient display performance. In addition, the storage effect under the focal conic state is relatively unstable, leading to a low reliability.

On the other hand, PSCT (Polymer Stabilized Cholesteric Texture), which is prepared by dispersing a small amount of a polymer material in the cholesteric liquid crystal material, has been proposed by D. K. Yang, L. C. Chein, J. W. Doane, et al. (IDRC Digest 91, p49) in an attempt to improve the display characteristics and stabilize the storage properties under, for example, the focal conic state (U.S. Pat. No. 5,384,067).

In PSCT, display is performed by utilizing the selective reflection of the visible light region in the planar structure and the weak scattering-transmission state in the focal conic structure, making it possible to achieve a high contrast. Also, since the polymer dispersed in the cholesteric liquid crystal material performs the function of provisional fixing, each state of mode is stabilized, making it possible to apply PSCT to a display element having a plurality of matrices.

However, the provisional fixing is performed by the polymer in the process of manufacturing the element. Specifically, in the manufacturing process, photopolymerizable monomers are added to the liquid crystal material, followed by irradiating the resultant mixture with, for example, an ultraviolet (UV) light so as to polymerize the monomers. The provisional fixing in question is achieved in the polymerizing step. Therefore, the liquid crystal material and the organic substances contained therein tend to be deteriorated by the unreacted substances, polymerization initiators, etc., resulting in failure for PSCT to exhibit excellent optical characteristics. Further, since a polymeric material, which is not a liquid crystal material, is added to the liquid crystal material, the addition of the polymeric material is limited in terms of the compatibility. It follows that an acceptable mixing range of the polymeric material is much limited.

BRIEF SUMMARY OF THE INVENTION

The present invention, which has been achieved in view of the above-described situation, is intended to provide a liquid crystal display element which permits a broad viewing angle and exhibits excellent optical characteristics over a wide range of wavelengths of light.

According to the present invention, there is provided a liquid crystal display element, comprising a pair of substrates, and a liquid crystal material held between these substrates, said liquid crystal material containing a main liquid crystal material and an auxiliary liquid crystal material whose phase can be separated from the phase of the main liquid crystal material.

The liquid crystal material used in the present invention exhibits states of reflection, scattering and transmission of light upon receipt of an external stimulation.

It is desirable for the main liquid crystal material to be in the form of a mixture of a cholesteric liquid crystal compound and a nematic liquid crystal compound. On the other hand, the auxiliary liquid crystal material should desirably be an organic compound having a perfluoroalkyl group and an organic residue group. Further, the organic residue group should desirably be in the form of $C_nH_{2n+1}$, where n is an integer of 1 to 25, preferably 3 to 18.

In the present invention, the auxiliary liquid crystal material should desirably be added to the main liquid crystal material in an amount of 0.1 to 3% by weight. Further, it is desirable for the liquid crystal material used in the present invention to have a large number of fine regions having a specified state of alignment.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Figure 1:
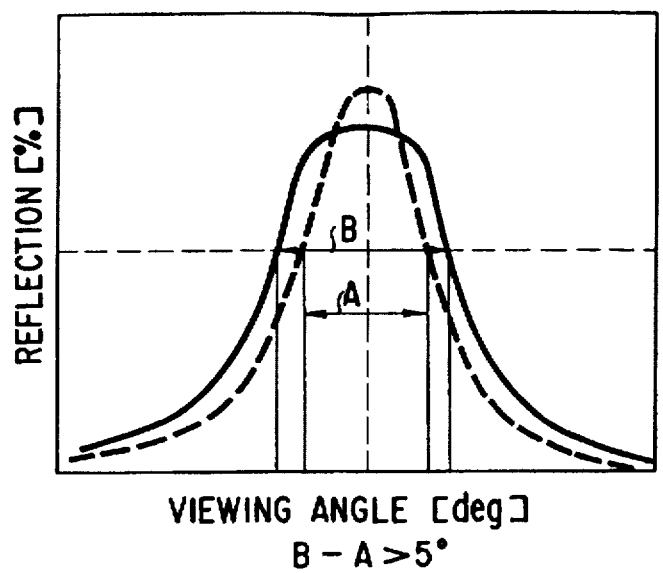
FIG. 1 is a graph showing the relationship between the reflection (%) and the viewing angle (degree)

Let us describe in detail some embodiments of the present invention with reference to the accompanying drawings.

The liquid crystal material used in the liquid crystal display element of the present invention comprises a main liquid crystal material and an auxiliary liquid crystal material. The main liquid crystal material is in the form of a mixture, which is liquid at room temperature, of a cholesteric liquid crystal compound and a nematic liquid crystal compound. On the other hand, the auxiliary liquid crystal material, which should bring about a phase separation from the main liquid crystal material at room temperature, includes an organic compound having, for example, a perfluoroalkyl group and an organic residue group, which is hereinafter referred to as a perfluoroalkyl-based organic compound. The liquid crystal material of the particular mixture system has a spontaneous twisted structure. It should be noted that the liquid crystal alignment state of the particular liquid crystal material is changed from a planar structure (reflection) to a focal structure (scattering) or a homeotropic structure (transmission) upon receipt of an external stimulation such as an electric field or magnetic field. Particularly, the planar structure and the focal conic structure are stored in this case as metastable states.

It is desirable for the main liquid crystal material to contain 30 to 50% by weight of a cholesteric liquid crystal compound in view of the requirement that the reflection wavelength region is set at the visible light region, though the content of the cholesteric liquid crystal compound differs depending on the pitch of the cholesteric liquid crystal compound.

The perfluoroalkyl-based organic compound, i.e., the auxiliary liquid crystal material, is a liquid crystal compound having a rigid rod-like molecular structure, which differs from the general alkyl-based liquid crystal compound exhibiting a flexibility. Because of the rigid rod-like molecular structure, the perfluoroalkyl-based organic compound serves to prevent the liquid crystal arrangement from being loosened. It follows that the addition of the perfluoroalkyl-based organic compound to the main liquid crystal material permits the metastable planar structure and focal conic structure to be maintained in a more stable state. As a result, the liquid crystal material of the present invention exhibits a so-called self-stable state in which the perfluoroalkyl-based organic compound forms a gelled state together with the main liquid crystal material. What should be noted is that the provisional fixing by a polymer as in PSCT is not required. In other words, the polymerization process need not be employed, with the result that the main liquid crystal material is free from the detrimental effects caused by a UV light irradiation and by the unreacted substances.

It should also be noted that the perfluoroalkyl-based organic compound retains a semi-molten state within the liquid crystal material and, thus, forms a so-called gelled state. In the gelled state, the liquid crystal material used in the present invention forms an aggregate of a large number of fine regions having a specified state of alignment. A liquid crystal layer formed by the particular aggregate differs in optical properties from the liquid crystal layer formed by a uniformly aligned single region.

The liquid crystal layer formed by a uniformly aligned single region has a twisted structure of the level sensitive to light and selectively reflects the light conforming with the twisting width. Therefore, only the light having a very narrow wavelength range can be reflected by the display element using a liquid crystal material consisting of a uniformly aligned single region. Also, the characteristics of the light relative to the wavelength thereof are changed depending on a transmitting angle of the light, i.e., an incident angle at the element.

The display element is required to exhibit optical characteristics upon receipt of light having a wide wavelength range and to have a wide viewing angle. The display element using a liquid crystal material consisting of a uniformly aligned single region fails to meet these requirements. When it comes to the liquid crystal material used in the present invention, however, various regions each exhibiting uniform characteristics upon receipt of light are present adjacent to each other. Also, subtle changes are recognized in the optical characteristics individually exhibited by these regions. It follows that the display element of the present invention exhibits optical characteristics upon receipt of light having a wide wavelength range and permits a wide viewing angle.

The perfluoroalkyl-based organic compound used in the present invention is not particularly limited, as far as the perfluoroalkyl group has at least two carbon atoms. On the other hand, the organic residue group contained in the perfluoroalkyl-based organic compound includes, for example, an alkyl group; an aromatic structure such as a benzene ring, a naphthalene ring or a biphenyl ring; and a hetero ring structure such as a pyridine ring or a piperidine ring. Particularly desirable is an alkyl group represented by a general formula $C_nH_{2n+1}$, where n is an integer of 1 to 25, preferably 3 to 18.

To be more specific, the perfluoroalkyl-based organic compound used in the present invention includes those represented by the general formulas given below:

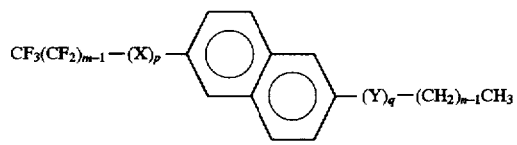

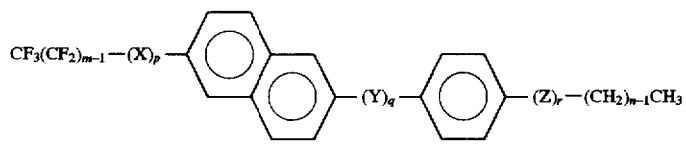

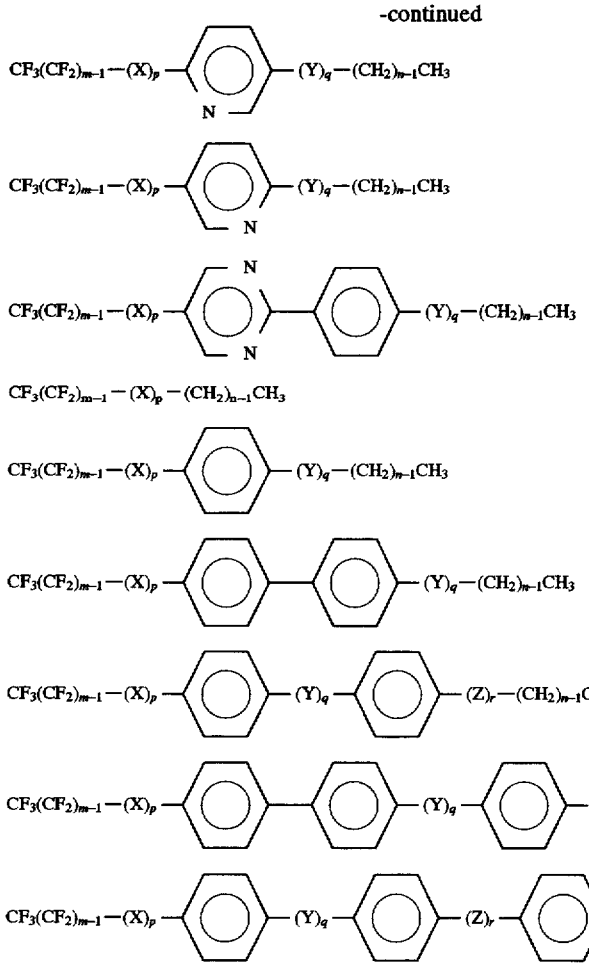

where each of m and n is an integer of 3 to 30; each of p, q, r, s is 0 or 1; and each of X, Y, Z, W is any of —O—, —C(=O)—O—, —O—C(=O)—O—, —CH=N— and —N=CH—. These perfluoroalkyl-based organic compounds can be used singly or in the form of a mixture of a plurality of compounds.

In the present invention, the perfluoroalkyl-based organic compound should be added in an amount of 0.01 to 90% by weight, preferably 0.1 to 3% by weight, based on the amount of the main liquid crystal material in view of the viscosity of the gel-like liquid crystal material after addition of the particular compound.

The liquid crystal material used in the present invention can be made to exhibit excellent effects by suitably controlling the adding amount of the perfluoroalkyl-based organic compound. Specifically, where the adding amount to a chiral nematic liquid crystal material, which is used as the main component, is 0.1% by weight or less, it is impossible to obtain a effect of prominently improving the characteristics of the display element. It should be noted that the perfluoroalkyl-based organic compound is used in many cases in the form of a mixture of a plurality of compounds. Therefore, addition of the perfluoroalkyl-based organic compound does not bring about a lowered reliability of the display element, though a reliability of the display element may be lowered in the case of dispersing a polymer or another high molecular weight compound in the main liquid crystal material as in the conventional element.

Where the adding amount of the perfluoroalkyl-based organic compound falls within a range of between 0.1 and 1.0% by weight, dispersion of the reflecting plane begins to take place during the selective reflection (or black reflection) of the chiral nematic liquid crystal material. Incidentally, the dispersion of the reflecting plane noted above denotes the condition that the reflecting planes of fine mirror-like reflecting regions are slightly deviated from the normal plane and dispersed at random. It should be noted that, even if dispersion of the reflecting plane begins to take place, the scattering itself caused by the dispersion is not markedly amplified. It follows that the light transmission under the focal conic state is not affected in the case of performing the storage-display operation.

Figure 2:
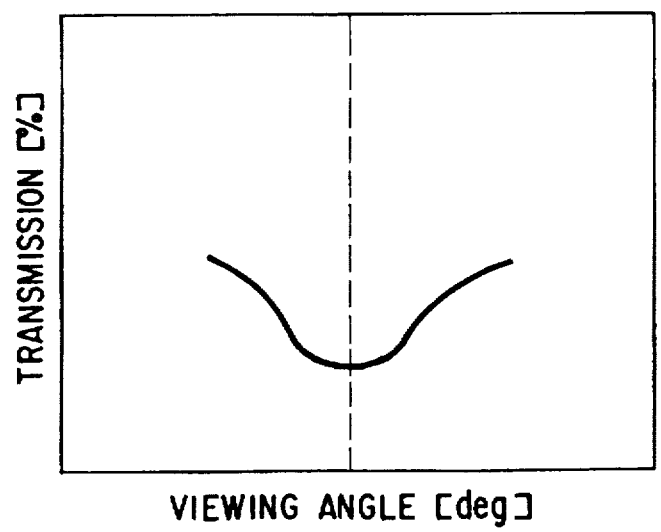
FIG. 2 is a graph showing the relationship between the transmission (%) and the viewing angle (degree)

It may be reasonable to understand that, in order to lower the driving voltage of the chiral nematic liquid crystal material, it is effective to use a chiral nematic liquid crystal material having a low transition temperature from the liquid crystal phase into the isotropic phase. In the case of using such a liquid crystal material as a main component, it may be possible to improve the thermal stability of the liquid crystal layer by using the same amount (0.1 to 1.0% by weight) of the perfluoroalkyl-based organic compound. When it comes to, for example, a chiral nematic liquid crystal containing 52% by weight of BL-001, which is a trade name of a nematic liquid crystal manufactured by Merck Inc., and 48% by weight of CB-15, which is a chiralic compound manufactured by Merck Inc., the transition temperature from the liquid crystal phase into the isotropic phase is 37° C. However, if 0.9% by weight of a perfluoroalkyl-based organic compound is added to the chiral nematic liquid crystal noted above, the transition temperature is increased by about 5° C. such that the resultant composition exhibits a liquid crystal phase under temperatures of up to about 42° C.

Where the adding amount of the perfluoroalkyl-based organic compound falls within a range of between 1.0 and 3.0% by weight, dispersion of reflecting planes is brought about prominently during the selective reflection of the chiral nematic liquid crystal. As a result, the viewing angle during the selective reflection can be enlarged by about 5° in terms of the half width value, compared with the ordinary viewing angle in the natural scattering of the chiral nematic liquid crystal, as shown in FIG. 1. In this case, the scattering under the focal conic state is also increased. It follows that, in the memory type display utilizing the selective reflection under the planar structure and the transmission state under the focal conic structure, turbidity is generated to some extent during the transmission. The turbid state permits lowering the turbidity over a wide viewing angle, as shown in FIG. 2. It follows that, under the state in which dispersion of the reflecting planes is improved during the selective reflection, the display over a wide viewing angle can be achieved without bringing about a large change in the contrast.

Further, where the adding amount of the perfluoroalkyl-based organic compound exceeds 3.0% by weight, the dispersibility of the reflecting planes of the chiral nematic liquid crystal is markedly improved during the selective reflection.

In the present invention, a dichroic pigment or the like can be added to the liquid crystal material in order to adjust the color tone of the selective reflection, though it is ideally desirable to use a material which permits absorbing the light of the wavelength failing to fall within a range of the selective reflection.

In assembling the liquid crystal display element of the present invention, the liquid crystal material may be transferred onto a surface of one of the substrates by means of a printing method, followed by bonding the other substrate to said one substrate with the liquid crystal layer sandwiched therebetween. Alternatively, the liquid crystal material may be once converted into a isotropic liquid by application of a heat treatment, followed by injecting the isotropic liquid by the ordinary method into the free space between the substrates of a cell assembled in advance.

The substrate used in the present invention includes, for example, a glass substrate, a polyester resin substrate, and an epoxy resin substrate. Further, the spacer material used for defining the distance between the two substrates includes, for example, a glass fiber, glass beads and resin beads.

Figure 3:
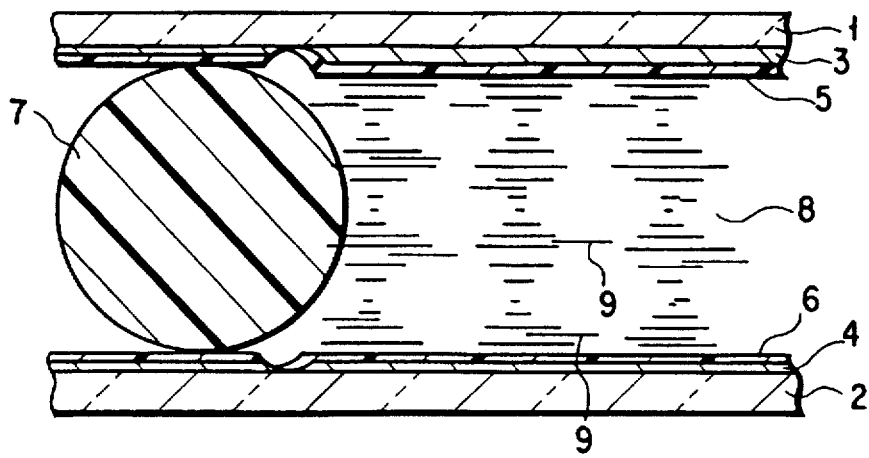
FIG. 3 is a cross sectional view schematically showing an example of a liquid crystal display element of the present invention.

FIGS. 3 and 4 collectively show a specific example of the liquid crystal display element of the present invention. Specifically, FIG. 3 is a cross sectional view schematically showing the construction of the liquid crystal display element. As seen from the drawing, the element comprises substrates 1 and 2. Transparent electrodes 3 and 4 are formed on the surfaces of these substrates 1 and 2, respectively. Further, alignment films 5 and 6 for aligning the liquid crystal molecules are formed on the transparent electrodes 3 and 4, respectively. The substrates 1 and 2 are maintained a predetermined distance apart from each other by a spacer 7. Still further, a liquid crystal material 8 is loaded in the free space formed between the two substrates 1 and 2.

The liquid crystal material 8 comprises a main liquid crystal material consisting of a nematic liquid crystal compound and a cholesteric liquid crystal compound (or chiral materials, organic compound with chirality), and a perfluoroalkyl-based organic compound 9 acting as an auxiliary liquid crystal material. Upon application of an external voltage signal, the state of alignment of the liquid crystal material of the particular composition is changed. The voltage of the voltage signal can be changed appropriately by using a voltage signal Vf for transformation into the focal conic structure and a voltage signal Vh for transformation into a homeotropic structure, thereby achieving optionally the transformation of the state of alignment of the liquid crystal material 8 among the planar structure, focal conic structure and homeotropic structure.

Figures 4A, 4B, 4C:
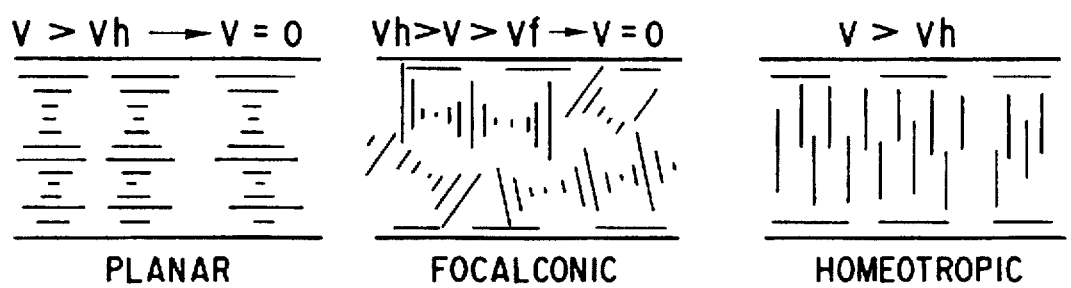
FIGS. 4A to 4C collectively show the states of arrangement/alignment of the liquid crystal molecules in the liquid crystal display element of the present invention.

FIGS. 4A to 4C show how the state of alignment of the liquid crystal material is selected. Specifically, FIG. 4A shows a planar state in which the state of parallel alignment is stabilized by the alignment films. If a signal voltage Vf is applied across the liquid crystal material 8, followed by removing the signal voltage, the initial alignment of the planar structure is changed into a focal conic structure as shown in FIG. 4B. Originally, the focal conic structure is stable only temporarily. However, the presence of the perfluoroalkyl-based organic compounds 9 permits the focal conic structure to be maintained for a long time. If a signal voltage Vh is applied in the next step across the liquid crystal material 8 of the focal conic structure, followed by removing the signal voltage, the focal conic structure is once changed into a homeotropic state as shown in FIG. 4C and, then, into the initial alignment of the planar state. It should be noted that these changes of the state of alignment are determined absolutely by the selection of the signal voltage Vf or Vh which is to be applied across the liquid crystal material 8. It follows that the device can be used as a memory type display element. It should also be noted that, in the particular driving system, a retaining voltage need not be applied, leading to a low power consumption. Also, since each state of the crystal alignment is maintained stable, the provisional fixing by a high molecular weight compound such as a polymer need not be employed, with the result that detrimental effects are not given to the liquid crystal material. It follows that the liquid crystal display element exhibits a high reliability.

The Examples given below are believed to clarify the effect of the present invention. These Examples are intended to facilitate the understanding of the present invention. Of course, the technical scope of the present invention is not limited by the following Examples.

EXAMPLE 1

A transparent electrode consisting of ITO was formed on a surface of each of two glass substrates, followed by forming a polyimide alignment film in a thickness of 40 nm on each of the transparent electrodes. Then, a rubbing treatment was applied to each of the alignment films such that the aligning direction of one alignment film is substantially perpendicular to that of the other alignment film. Incidentally, the aligning direction of one alignment film may be parallel with that of the other alignment film. The two glass substrates each having the transparent electrode and alignment film formed thereon were disposed such that the alignment films were allowed to face each other. These alignment films were positioned to permit the aligning direction of one alignment film to be substantially perpendicular to that of the other alignment film. Under this condition, spacer balls each having a diameter of 6 μm were interposed between the two glass substrates so as to prepare a vacant cell by an ordinary method.

On the other hand, a liquid crystal material was prepared by adding 3% by weight of a perfluoroalkyl-based organic compound (auxiliary liquid crystal material) to a main liquid crystal material containing 79% by weight of E-8 (a cyanobiphenyl-based liquid crystal mixture manufactured as a nematic liquid crystal by Merck Inc.) and 21% by weight of S-811 (manufactured by Merck Inc.) as a chiral agent. The resultant liquid crystal material was converted at 90° C. into an isotropic liquid, followed by loading the vacant cell prepared in advance with the isotropic liquid by an ordinary method so as to prepare a liquid crystal display element of the present invention.

The resultant liquid crystal display element was naturally cooled to room temperature. When the state of alignment was stabilized, an electric field was applied across the liquid crystal display element so as to look into the response characteristics of the element such as the reflectance, bistability and driving voltage, with the results as shown in Table 1. The signal voltage Vf in this test was 17 to 37 V, with the other signal voltage Vh being 40 V.

EXAMPLE 2

A transparent electrode consisting of ITO was formed on a surface of each of two glass substrates, followed by forming a polyimide alignment film in a thickness of 40 nm on each of the transparent electrodes. Then, a rubbing treatment was applied to each of the alignment films such that the aligning direction of one alignment film is substantially parallel with that of the other alignment film. The two glass substrates each having the transparent electrode and alignment film formed thereon were disposed such that the alignment films were allowed to face each other. These alignment films were positioned to permit the aligning direction of one alignment film to be substantially parallel with that of the other alignment film. Under this condition, spacer balls each having a diameter of 6 μm were interposed between the two glass substrates so as to prepare a vacant cell by an ordinary method.

On the other hand, a liquid crystal material was prepared by adding 1.5% by weight of a perfluoroalkyl-based organic compound (auxiliary liquid crystal material) to a main liquid crystal material consisting of 57% by weight of E-63 (a cyanobiphenyl-based liquid crystal mixture manufactured as a nematic liquid crystal by Merck Inc.) and 43% by weight of CB-15 (a cholesteric liquid crystal manufactured by Merck Inc.) as a chiral agent. The resultant liquid crystal material was converted at 90° C. into an isotropic liquid, followed by loading the vacant cell prepared in advance with the isotropic liquid by an ordinary method so as to prepare a liquid crystal display element of the present invention.

The resultant liquid crystal display element was naturally cooled to room temperature. When the state of alignment was stabilized, an electric field was applied across the liquid crystal display element so as to look into the response characteristics of the element such as the reflectance, bistability and driving voltage, with the results as shown in Table 1. The signal voltage Vf in this test was 15 to 35 V, with the other signal voltage Vh being 38 V.

COMPARATIVE EXAMPLE

A transparent electrode consisting of ITO was formed on a surface of each of two glass substrates, followed by forming a polyimide alignment film in a thickness of 40 nm on each of the transparent electrodes. Then, a rubbing treatment was applied to each of the alignment films such that the aligning direction of one alignment film is substantially parallel with that of the other alignment film. The two glass substrates each having the transparent electrode and alignment film formed thereon were disposed such that the alignment films were allowed to face each other. These alignment films were positioned to permit the aligning direction of one alignment film to be substantially parallel with that of the other alignment film. Under this condition, spacer balls each having a diameter of 6 μm were interposed between the two glass substrates so as to prepare a vacant cell by an ordinary method.

On the other hand, a liquid crystal material was prepared by dispersing 1.5% by weight of Karayat R-551 (trade name of a ultraviolet-curable resin manufactured by Nippon Kayaku K.K.) in a main liquid crystal material consisting of 58% by weight of E-48 (trade name of a cyanobiphenyl-based liquid crystal mixture manufactured as a cholesteric liquid crystal by Merck Inc.) and 42% by weight of CB-15 referred to previously. The resultant liquid crystal material was converted at 90° C. into an isotropic liquid, followed by loading the vacant cell prepared in advance with the isotropic liquid by an ordinary method. Then, the resultant cell was irradiated with an ultraviolet light so as to cure the ultraviolet-curable resin and, thus, to prepare a conventional PSCT type liquid crystal display element.

An electric field was applied across the liquid crystal display element so as to look into the response characteristics of the element such as the reflectance, bistability and driving voltage, with the results as shown in Table 1.

TABLE 1

| | Reflectance (%) | Bistability | Driving Voltage (V) |
|---|---|---|---|
| Example 1 | 42 | good | 38 |
| Example 2 | 48 | good | 40 |
| Comparative Example | 40 | good | 50 |

To reiterate, the liquid crystal material used in the liquid crystal display element of the present invention (Examples 1 and 2) does not contain a high molecular weight resin. As apparent from Table 1, the display element of the present invention exhibits a stable aligning state, good display characteristics and a low driving voltage. On the other hand, a high molecular weight resin is contained in the liquid crystal material used in the conventional liquid crystal display element. In this case, the optical characteristics of the display element are adversely affected. Specifically, the reflectance of the display element is relatively low. Also, since a voltage drop is caused by the high molecular weight resin matrix, the driving voltage of the display element was found to be high.

As described above in detail, the present invention provides a liquid crystal display element comprising a pair of substrates and a liquid crystal material held between the substrates. It should be noted that the liquid crystal material comprises a main liquid crystal material and an auxiliary liquid crystal material whose phase can be separated from the phase of the main liquid crystal material. Further, the liquid crystal material of the particular composition exhibits the states of reflection, scattering and transmission upon receipt of an external stimulation. It follows that the present invention provides a highly reliable liquid crystal display element which exhibits a wide viewing angle and excellent optical characteristics over a wide wavelength range.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

We claim:

1. A liquid crystal display element, comprising a pair of substrates, and a liquid crystal material held between these substrates, said liquid crystal material containing a main liquid crystal material and an auxiliary liquid crystal material whose phase can be separated from the phase of the main liquid crystal material, wherein said auxiliary liquid crystal material is an organic compound having a perfluoroalkyl group containing at least two carbon atoms and an organic residue group.

2. The liquid crystal display element according to claim 1, wherein said liquid crystal material exhibits the states of reflection, scattering and transmission upon receipt of an external stimulation.

3. The liquid crystal display element according to claim 1, wherein said liquid crystal material contains as a main liquid crystal material a mixture of a cholesteric liquid crystal compound and a nematic liquid crystal compound.

4. The liquid crystal display element according to claim 1, wherein said organic residue group is represented by a general formula $C_nH_{2n+1}$, where n is an integer of 1 to 25.

5. The liquid crystal display element according to claim 1, wherein said liquid crystal material contains 0.1 to 3% by weight of said auxiliary liquid crystal material.

6. The liquid crystal display element according to claim 1, wherein an alignment state of the liquid crystal material is change from a planar structure to a focal conic structure upon receipt of an external stimulation.

7. The liquid crystal display element according to claim 1, wherein an alignment state of the liquid crystal material is changed from a planar structure to a homeotropic structure upon receipt of an external stimulation.

8. A liquid crystal display element, comprising a pair of substrates, and a liquid crystal material held between these substrates, said liquid crystal material containing a main liquid crystal material and an auxiliary liquid crystal material whose phase can be separated from the phase of the main liquid crystal material, wherein said auxiliary liquid crystal material is substantially free of monomers, oligomers, and polymers.

* * * * *